Dec. 7, 1971 F. G. READE ET AL 3,624,897

METHOD OF MAKING A FERRITE HEAD

Filed July 25, 1969 2 Sheets-Sheet 1

Franklin G. Reade,
Tazzell Smith,
INVENTORS.

By David Willis
Attorney

Franklin G. Reade,
Tazzell Smith,
INVENTORS.
BY.
David Weiss
ATTORNEY.

United States Patent Office 3,624,897

Patented Dec. 7, 1971

3,624,897

METHOD OF MAKING A FERRITE HEAD

Franklin G. Reade, Monrovia, and Tazzell Smith, Los Angeles, Calif., assignors to Bell & Howell Company, Chicago, Ill.

Filed July 25, 1969, Ser. No. 844,851

Int. Cl. H01f 7/06

U.S. Cl. 29—603 7 Claims

ABSTRACT OF THE DISCLOSURE

A method of manufacturing a ferrite magnetic head, the pole tips being separated by a glass-filled gap of predetermined length, at least one of the ferrite-glass interfaces having been prepared by radio-frequency sputtering of glass on the ferrite. The method includes the following steps:

(1) sputtering a layer of glass on a plurality of selected portions of a planar surface of a first ferrite member;

(2) applying a layer of a refractory material on other portions of said surface alternating with said selected portions, said layer of refractory material having a thickness equal to the desired gap length; and (3) fusion bonding said layer of glass to a planar surface of a second ferrite member while said layer of refractory material is maintained in contact engagement with said surface of said second member.

BACKGROUND OF THE INVENTION

(1) Field of the invention

This invention relates to ferrite heads for magnetic recording/playback apparatus, and more particularly to an improved method of making ferrite heads having very small gap lengths.

(2) Description of the prior art

The high magnetic permeability and low electrical conductivity of ferrites have made this class of materials available for utilization as cores for magnetic transducer heads, particularly for recording high-frequency signals on magnetic tape. Such cores include a pair of poles separated at their tips by an accurately defined gap. During recording or playback, magnetic tape is transported over the "running surface' of the head in a direction parallel to the gap "length (i.e., the distance between the pole tips) in magnetic contact with the poles.

The brittleness of polycrystalline ferrite materials, however, has been primarily responsible for the experienced useful life of such heads being less than wear expectation based upon the hardness of such materials, producing chipping and crystal breakout at the pole tips.

A conventionally practiced method of counteracting the effect of such brittleness is to mechanically support the ferrite material at the pole tips by filling the gap with a nonmagnetic, wear-resistant, structural material, such as glass. Since the extent of the support afforded by the glass gap-material is greatly influenced by the integrity of the ferrite-to-glass interface, it is generally agreed that the glass gap-material should be intimately bonded to the ferrite pole tips and that the useful life of the head is directly related to the success in forming the bond.

The prior art includes several methods for forming bonds between the ferrite and the glass, such as by inserting a glass-forming powder or glaze, or a glass plate, between flat confronting surfaces of two ferrite members and heating the assembly to melt the glass while the two members are moved toward one another until the desired gap length is attained. In another method, suitable for forming gaps of capilliary dimensions, the surfaces of the two ferrite members are separated by interposed shims having a thickness equal to the desired gap length, and a quantity of glass (such as a glass rod) is placed adjacent to the gap; when the assembly is heated to melt the glass rod, the liquuified glass is drawn into the gap by capillary action. With respect to minimum producible gap lengths, the state of the prior art has reached a practical limit of one micron.

The extent of the mechanical support at the glass-ferrite interfaces, produced by these methods, has not in fact eliminated the problem of pole tip deterioration through chipping and crystal breakout. Even the most dense ferrite materials include pores which are not usually filled by the glass when they occur in the gap face. In each of these methods, the integrity of the bond is further affected to some extent by the existence of pores in the glass.

The existence of pores at the ferrite-glass interface, whether in the glass or in the ferrite material, does not provide a continuous transition between the two materials for completely supporting the pole tips. The problem is particularly acute with respect to the ferrite-glass interface first encountered by the transported tape on the head's running surface, since the ferrite is mechanically unsupported against the direction of tape transport wherever a pore is present at this interface, permitting chipping and crystal breakout of the ferrite at the gap.

SUMMARY OF THE INVENTION

The present invention recognizes that one of the ferrite-glass interfaces is subjected to greater wear than the other, and comprises a method for creating a more intense bond and a more continuous transition between the glass and and ferrite of at least one of the interfaces than has been possible with prior-art methods of manufacturing ferrite heads.

In accordance with a preferred manner of practicing the method of the present invention, a layer of glass is deposited on one or more discrete portions of a planar surface of one of two ferrite members—by radio-frequency (RF) sputtering, a technique well known to the insulator deposition art; see, for example, Electronics, Sept. 20, 1965, page 145. Between successive glass sputtered portions a layer of refractory material (having a melting point higher than that of the glass) is deposited by suitable deposition techniques; e.g., vacuum deposition of silicon monoxide. The refractory layer is deposited to a thickness equal to the desired gap length, and all of the surface portions are coplanar.

The layer of glass is thereupon fusion bonded to the second ferrite member, the two members being in confronting relation such that the layer of refractory material is maintained in contact engagement with corresponding surfaces of the second member.

The glass layer is sputtered to a thickness equal to or slightly less than the desired gap length, so that the ferrite members need not be moved toward each other once they are positioned.

The disadvantages in the prior art methods are substantially overcome by the method of the present invention. When the RF sputtering process is applied to the deposition of glass on ferrite, the layer of glass which is deposited and subsequently fused has fewer pores than the glass-filled gaps produced by the prior-art methods, and the pores in the ferrite surface are more nearly filled with glass due to the high impact process by which the sputtered glass particles strike the ferrite and the plural angles of incidence. Moreover, it is believed that the high impact of the glass particles causes the particles to be embedded below the surface of the ferrite (perhaps to the thickness of a few molecules), contributing to the producing of an intense bond between the glass and the ferrite.

BRIEF DESCRIPTION OF THE DRAWINGS

The novel features which are believed to be characteristic of the invention will be better understood from the following description considered in connection with the accompanying drawings in which a preferred manner of practicing the method of the present invention is illustrated by way of example. It is expressly understood, however, that the drawings are for the purpose of illustration and description only and are not intended as a definition of the limits of the invention.

DETAILED DESCRIPTION OF THE INVENTION

Figure 1:
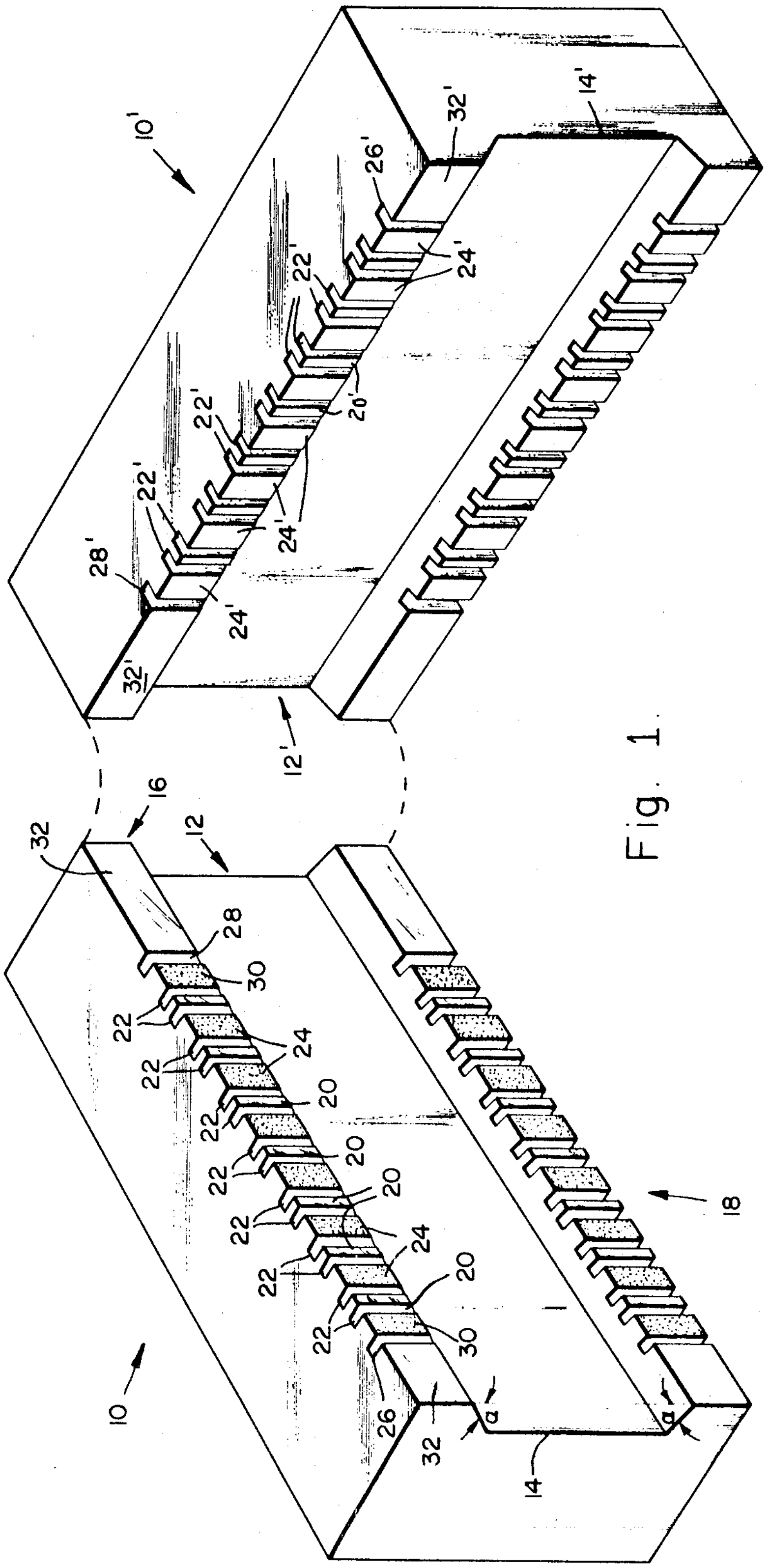
FIG. 1 is a perspective view of two ferrite members which have been prepared in accordance with a preferred manner of practicing the method of the present invention and which will result in the fabrication of two multitrack magnetic heads.

Turning first to FIG. 1, a first magnetic ferrite member 10 is machined to have a face 12 profiled to include a channel portion 14 with respect to a rectangular upper surface 16 and a rectangular lower surface 18. The surfaces 16, 18 are coplanar and longitudinally parallel to each other, the intersection of the channel portion 14 with each of the surfaces 16, 18 forming an acute angle $\alpha$. It should be realized, however, that if the method of the present invention were practiced for fabricating only a single multitrack head, there would be no restrictions applied to the angle formed by the intersection between the channel portion 14 and the lower surface 18.

A plurality of first discrete surface portions 20 of the upper surface 16 are selected in spaced relation to one another, the position of each of the first surface portions coinciding with the desired pole tip locations. These surface portions 20 are rectangular in configuration and are longitudinally parallel to each other, their longitudinal dimensions being perpendicular to the longitudinal dimension of the upper surface 16. Preferably, parallel grooves 22 are cut in the upper surface 16, on both sides of each suface portion 20, for precisely defining the width of each of the first surface portions.

A series of second discrete surface portions 24 remain between the grooves 22, the second surface portions 24 being respectively positioned between successive first surface portions 20. It is preferred that a first groove 26 and a last groove 28 be additionally cut for dividing each of the remaining end portions of the upper surface 16 into a third surface portion 30 (similar to the second surface portions 24) and a fourth surface portion 32 which extends to the edge of the upper surface 16.

The lower surface 18 can be prepared in a manner similar to the upper surface 16, if it is desired to fabricate a second multitrack head. Although the configuration of the lower surface 18 is shown in FIG. 1 to be identical to the configuration of the upper surface 16, it should be realized that the number, spacing and width of the various discrete surface portions can be varied, depending upon the number of tracks, the gap width and spacing between tracks desired in a particular head unit.

A second magnetic ferrite member 10' is machined to have a second face 12', profiled to include a second channel portion 14' with respect to a rectangular second upper surface 16' and a rectangular second lower surface 18', the second surfaces 16', 18' being coplanar and arranged for confronting relation with respect to the upper and lower surfaces 16, 18 of the first ferrite member 10. Although the second upper and lower surfaces 16', 18' can be continuous, it is preferred that grooves 22', 26', 28' be cut therein to define surface portions 20', 24', 30', 32' arranged for confronting relation with corresponding surface portions 20, 24, 30, 32 of the first ferrite member 10. Accordingly, the above description of the first ferrite member 10 can be utilized for describing the preferred configuration of the second ferrite member 10', it being understood that primed referenced numerals are used in the drawings to indicate features of the second ferrite member 10' corresponding to those of the first ferrite member 10.

The machined face 12 of the ferrite member 10 is thereupon prepared for having deposited on the first discrete surface portions 20 and (preferably) on the fourth surface portions 32, by RF sputtering, a layer of glass having hardness and thermal expansion characteristics compatible with those of the ferrite material. Such layer of glass, having a thickness substantially equal to or slightly less than the desired gap length is thereupon sputtered onto the surface portions in accordance with RF sputtering methods well-known in the art.

After the glass layer has been sputtered on the first and fourth surface portions 20, 32, the face 12 of the first ferrite member 10 is prepared to have a refractory material (having a melting temperature higher than that of the sputtered glass) applied to the second and third surface portions 24, 30. The refractory material is thereupon applied to these surface portions to a thickness equal to the desired gap length. For example, a layer of silicon monoxide can be deposited on the surfaces by well-known vacuum deposition techniques, the deposited layer being equal to the desired gap length.

Obviously, the method of the present invention can be practiced with the glass sputtering and refractory material deposition steps in reverse order.

The two ferrite members 10, 10' are thereupon positioned with their faces 12, 12' in confronting relation; i.e., the various surface portions 20, 24, 30, 32 of the first ferrite member confronting the corresponding surface portions 20', 24', 30', 32' of the second ferrite member. The refractory layer serves as a spacer, and the glass-sputtered surface portions 20, 32 are maintained spaced from their confronting surface portions 20', 32' by the thickness of the refractory layer; i.e., the desired gap length. The entire assembly is thereupon heated to a temperature for causing the glass to melt, after which the assembly is permitted to cool, thereby fusion bonding the sputtered glass layer on first surface portions 20, 20' to the confronting fourth surface portions 32, 32'. During heating and cooling, the presence of the refractory spacers between successive gaps assists in the prevention of gap length changes due to thermal expansion and contraction of the ferrite members 10, 10'. The spacers are particularly effective in preventing decreases in the gap lengths when the glass is in a molten condition, a circumstance which would cause the sputtered glass to exude from the space between the confronting ferrite surfaces.

Figures 2, 3:
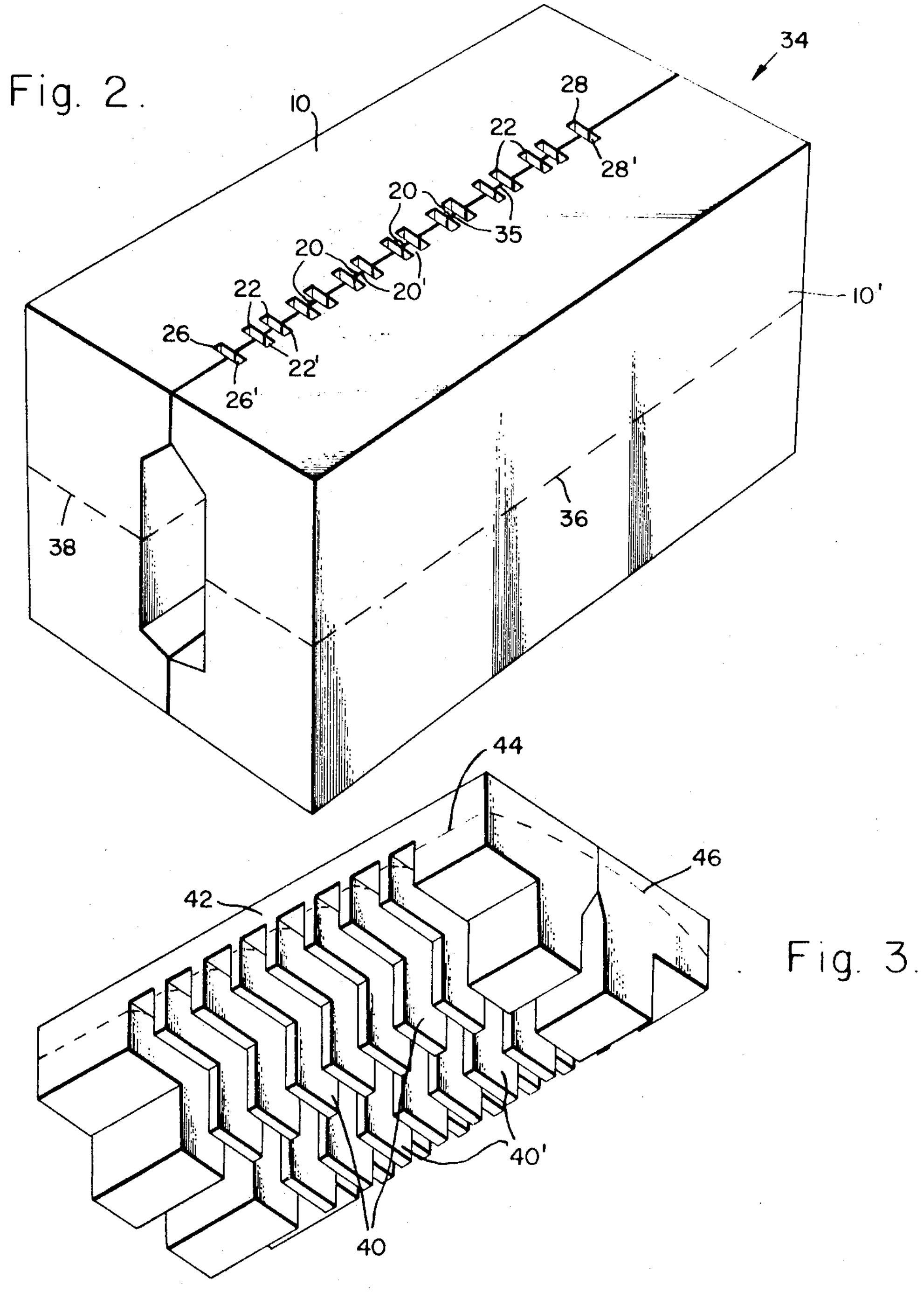
FIG. 2 is a perspective view of the ferrite members shown in FIG. 1 which have been assembled by fusion bonding.
FIG. 3 is a perspective view of one-half of the assembly shown in FIG. 2 which has been shaped to demonstrate a possible pole configuration for a multitrack magnetic head.

The bonded assembly 34 is shown in FIG. 2, and the pairs of mating grooves 22, 22' serve as visible indicia for precisely defining the location of the glass-bonded surface portions and the glass-filled gaps 35 therebetween. These glass-bonded surfaces are to become pole tip pairs upon subsequent shaping of the assembly 34.

The assembly 34 is cut along lines 36, 38, dividing the assembly 34 into two parts, each of which is shaped to provide a multipole structure for a multitrack magnetic head.

For example, one of the severed parts can be shaped as shown in FIG. 3. The material between the first groove 26 and the adjacent groove 22, the last groove 28 and its adjacent groove 22, and thereafter between alternate ones of grooves 22, are removed except for a portion of such material slightly above the desired gap height. Further material can be removed to define legs 40, 40'. The resulting structure, as shown in FIG. 3. comprises a series of magnetic poles bonded together at their pole tips and at the fourth surface portion 32, maintained as an integral assembly by an uncut portion of glass-bonded ferrite material 42.

After each leg pair 40, 40' is magnetically closed (e.g., by placing thereacross respective yokes or magnetic closing pieces, not shown) and the successive poles are magnetically shielded from one another by interposition of suitable shield and spacing members, (not shown) the unit is encapsulated with a suitable encapsulant such as an epoxy. The uncut glass bonded ferrite portion 42 is thereupon removed (e.g., by grinding) along line 44 and curve 46 to reveal the glass-bonded pole tip structures, each separated from one another by a predetermined distance. All of the refractory material previously deposited is therefore removed, and the ground surface comprises the running surface of a complete multitrack magnetic head.

Since only one pole tip of each pair has been glass sputtered, the completed head should be positioned in the recording and/or playback apparatus such that the pole tip sputtered glass interface is first encountered by the tape during transport along the head's running surface.

In an alternative manner of practicing the method of the present invention, a second layer of glass is additionally sputtered on the first and fourth surface portions 20', 32' of the second ferrite member 10'. Accordingly, the thickness of each of the sputtered glass layers is (preferably) substantially equal to or slightly less than one-half the desired gap length.

The refractory material can be deposited on the appropriate surfaces of only one of the ferrite members 10, 10', in which case the thickness of the refractory layer will be equal to the desired gap length. If, however, the refractory material is applied to each of the ferrite members 10, 10', the combined thicknesses of both layers will be equal to the desired gap length; as one example, the thickness of the refractory layer of each of the ferrite members can be equal to one-half of the desired gap length.

During subsequent heating and cooling, the two layers of glass are fused to one another, and since each of the ferrite-glass interfaces have been subjected to the sputtering process, a completed head unit acn be positioned in the recording and/or playback apparatus without consideration to the interface first encountered by the tape during transport along the head's running surface. Using the method disclosed herein, multitrack ferrite heads have been reproducibly manufactured having gap lengths as small as one-fifth micron (by the preferred manner of practicing the invention) and as great as ten microns (by the alternative manner of practicing the invention).

Thus, there has been shown an improved method of making multitrack magnetic ferrite recording/playback heads, including a preferred and an alternative manner of practicing the invention. Modifications in the method of the present invention, and variations in the preferred and alternative manner of practicing the invention herein presented, may be developed without departing from the essential characteristics thereof. Accordingly, the invention should be limited only by the scope of the claims listed below.

What is claimed is:

1. In a method for manufacturing a magnetic head having at least one pole tip pair, the tips of each pair separated by a non-magnetic gap of a desired length, the steps comprising (1) preparing a first ferrite member to have a plurality of spaced, coplanar first surfaces;

(2) preparing a second ferrite member to have a plurality of spaced, coplanar second surfaces corresponding to said first surfaces for confronting relation therewith;

(3) sputtering a layer of glass on alternate ones of said first surfaces, said layer of glass having a thickness equal to or slightly less than the desired gap length;

(4) applying a layer of refractory material on other ones of said first surfaces, said refractory layer having a thickness equal to the desired gap length;

(5) placing said first and second ferrite members with corresponding ones of said first and second surfaces in confronting relation and said refractory layer in contact engagement with confronting ones of said second surfaces; and (6) fusing said layer of glass while said refractory layer is maintained in contact engagement with confronting ones of said second surfaces, thereby bonding the two members together.

2. In a method for manufacturing a multitrack magnetic head having at least one pole tip pair, the tips of each pair separated by a nonmagnetic gap of a desired length, the steps comprising:

(1) preparing a first ferrite member to have a plurality of spaced, coplanar first surfaces;

(2) preparing a second ferrite member to have a plurality of spaced, coplanar second surfaces corresponding to said first surfaces for confronting relation therewith;

(3) sputtering a first layer of glass on alternate ones of said first surfaces;

(4) sputtering a second layer of glass on alternate ones of said second surfaces, said alternate ones of said second surfaces corresponding to said alternate ones of said first surfaces for confronting relation therewith, said first and second layers of glass having a combined thickness equal to or slightly less than the desired gap length;

(5) applying a layer of a refractory material on other ones of said first surfaces, said refractory layer having a thickness equal to the desired gap length;

(6) placing said first and second ferrite members with corresponding ones of said first and second surfaces in confronting relation and said refractory layer in contact engagement with confronting ones of said second surfaces; and (7) fusion bonding said layers of glass while said refractory layer is maintained in contact engagement with confronting ones of said second surfaces.

3. In a method for manufacturing a multitrack magnetic head having at least one pole tip pair, the tips of each pair separated by a nonmagnetic gap of a desired length, the steps comprising:

(1) machining a face of a first ferrite member to have an upper surface and a lower surface, said surfaces being coplanar and separated by a profiled channel;

(2) machining a face of a second ferrite member to have coplanar upper and lower surfaces corresponding to said surfaces of said first ferrite member;

(3) sputtering a layer of glass on selected portions of said upper surface of said first ferrite member, said layer of glass having a thickness equal to or slightly less than the desired gap length;

(4) depositing a layer of a refractory material on other portions of said upper surface and on said lower surface of said first ferrite member, said other portions alternating with said selected portions, said layer of refractory material having a thickness equal to the desired gap length;

(5) placing said first and second ferrite members with said upper surfaces in confronting relation and with said lower surfaces in confronting relation, and with the refractory material and the surfaces confronting same in contact engagement; and (6) heating the assembly of step (5) to melt the glass and thereafter cooling said assembly to solidify the glass, while maintaining said upper and lower surfaces in said relation, thereby bonding the two members together.

4. The method according to claim 3, above wherein said machined face of said second ferrite member includes a profiled channel separating said upper surfaces from said lower surfaces.

5. The method according to claim 3, above, the multitrack head positionable in combination with tape transport apparatus such that said first ferrite member is encountered prior to said second ferrite member by supplied tape during normal transport thereof.

6. In a method for manufacturing magnetic heads each having at least one pole tip pair, the tips of each pair separated by a nonmagnetic gap of a desired length, the steps comprising:

(1) machining a face of a first ferrite member to have coplanar upper and lower surfaces separated by a profiled channel;

(2) machining a face of a second ferrite member to have coplanar upper and lower surfaces corresponding to said surfaces of said first ferrite member;

(3) sputtering a layer of glass on selected portions of said upper and lower surfaces of said first ferrite member, said layer of glass having a thickness equal to or slightly less than the desired gap length;

(4) depositing a layer of a refractory material on other portions of said upper and lower surfaces of said first ferrite member, said other portions of said upper surface alternating with said selected portions thereof, and said other portions of said lower surface alternating with said selected portions thereof, said layer of refractory material having a thickness equal to the desired gap length;

(5) placing said first and second ferrite members with said upper surfaces in confronting relation and with said lower surfaces in confronting relation, and with the refractory material and the surfaces confronting same in contact engagement; and (6) heating the assembly of step (5) to melt the glass and thereafter cooling said assembly to solidify the glass, while maintaining said upper and lower surfaces in said relation, thereby bonding the two members together.

7. In a method for manufacturing a multitrack magnetic head having at least one pole tip pair, the tips of each pair separated by a nonmagnetic gap of a desired length, the steps comprising:

(1) preparing a first ferrite member to have a plurality of spaced, coplanar first surfaces;

(2) preparing a second ferrite member to have a plurality of spaced, coplanar second surfaces corresponding to said first surfaces for confronting relation therewith;

(3) sputtering a first layer of glass on alternate ones of said first surfaces;

(4) sputtering a second layer of glass on alternate ones of said second surfaces, said alternate ones of said second surfaces corresponding to said alternate ones of said first surfaces for confronting relation therewith, said first and second layers of glass having a combined thickness equal to or slightly less than the desired gap length;

(5) applying a first layer of a refractory material on other ones of said first surfaces;

(6) applying a second layer of a refractory material on other ones of said second surfaces, said first and second refractory layers having a combined thickness equal to the desired gap length;

(7) placing said first and second ferrite members with corresponding ones of said first and second surfaces in confronting relation and confronting ones of said refractory layers in contact engagement; and (8) fusion bonding said layers of glass while said refractory layers are maintained in contact engagement.

References Cited

UNITED STATES PATENTS

| | | | |
|---|---|---|---|
| 3,117,367 | 1/1964 | Duinker et al. | 29—603 |
| 3,283,396 | 11/1966 | Pfost | 29—603 |
| 3,375,575 | 4/1968 | Visser et al. | 29—603 |
| 3,458,926 | 8/1969 | Maissel et al. | 29—603 |
| 3,502,821 | 3/1970 | Duinker | 29—603 X |

JOHN F. CAMPBELL, Primary Examiner

C. E. HALL, Assistant Examiner

U.S. Cl. X.R.

156—292; 179—100, 26